United States Patent
Wakimoto et al.

(10) Patent No.: US 10,938,057 B2
(45) Date of Patent: Mar. 2, 2021

(54) METHOD OF MANUFACTURING SECONDARY BATTERY

(71) Applicant: SANYO Electric Co., Ltd., Daito (JP)

(72) Inventors: Ryoichi Wakimoto, Hyogo (JP); Naoya Tada, Hyogo (JP)

(73) Assignee: SANYO Electric Co., Ltd., Daito (JP)

(*) Notice: Subject to any disclaimer, the term of this patent is extended or adjusted under 35 U.S.C. 154(b) by 0 days.

(21) Appl. No.: 16/155,226

(22) Filed: Oct. 9, 2018

(65) Prior Publication Data
US 2019/0115611 A1    Apr. 18, 2019

(30) Foreign Application Priority Data
Oct. 17, 2017 (JP) .............................. JP2017-201088

(51) Int. Cl.
| | |
|---|---|
| *H01M 2/26* | (2006.01) |
| *H01M 2/22* | (2006.01) |
| *H01M 2/30* | (2006.01) |
| *H01M 2/20* | (2006.01) |
| *H01M 10/04* | (2006.01) |
| *H01M 2/08* | (2006.01) |

(52) U.S. Cl.
CPC ............. *H01M 10/04* (2013.01); *H01M 2/08* (2013.01); *H01M 2/266* (2013.01); *H01M 2/30* (2013.01); *H01M 2/305* (2013.01); *H01M 10/0413* (2013.01)

(58) Field of Classification Search
None
See application file for complete search history.

(56) References Cited

U.S. PATENT DOCUMENTS

| | | | | |
|---|---|---|---|---|
| 2012/0003528 A1* | 1/2012 | Kusukawa | .......... | H01M 2/0212 429/179 |
| 2012/0055909 A1* | 3/2012 | Miyake | .................. | B23K 33/00 219/121.64 |

FOREIGN PATENT DOCUMENTS

JP    2014-182993 A    9/2014

* cited by examiner

*Primary Examiner* — Yoshitoshi Takeuchi
(74) *Attorney, Agent, or Firm* — Westerman, Hattori, Daniels & Adrian, LLP

(57) ABSTRACT

A method of manufacturing a secondary battery including an electrode body including a positive electrode plate and a negative electrode plate, an outer package including an opening and housing the electrode body, a sealing plate sealing the opening, a negative electrode terminal attached to the sealing plate, a negative electrode tab portion provided in the negative electrode plate, and a negative electrode collector electrically connecting the negative electrode tab portion and the negative electrode terminal to each other, the method including welding a flange portion of the negative electrode terminal and the negative electrode collector together by projecting an energy ray, the negative electrode collector includes, before the welding, a rough surface portion, and in the welding, the flange portion of the negative electrode terminal and the negative electrode collector are connected by welding by projecting an energy ray onto the rough surface portion.

8 Claims, 11 Drawing Sheets

METHOD OF MANUFACTURING SECONDARY BATTERY

CROSS REFERENCE TO RELATED APPLICATIONS

The present invention application claims priority to Japanese Patent Application No. 2017-201088 filed in the Japan Patent Office on Oct. 17, 2017, the entire contents of which are incorporated herein by reference.

BACKGROUND OF THE INVENTION

Field of the Invention

The present disclosure relates to a method of manufacturing a secondary battery.

Description of Related Art

Square secondary batteries such as alkaline secondary batteries and nonaqueous electrolyte secondary batteries are used in power sources for driving electric vehicles (EV), hybrid electric vehicles (HEV, PHEV), and the like.

In such square secondary batteries, a battery case is formed by a bottomed cylindrical square outer package including an opening and a sealing plate that seals the opening. The battery case accommodates therein an electrode body including positive electrode plates, negative electrode plates, and separators, and an electrolyte. A positive electrode terminal and a negative electrode terminal are attached to the sealing plate. The positive electrode terminal is electrically connected to the positive electrode plate through a positive electrode collector, and the negative electrode terminal is electrically connected to the negative electrode plate through a negative electrode collector.

The positive electrode plate includes a positive electrode core body made of metal and a positive electrode active material mixture layer formed on the surface of the positive electrode core body. A positive electrode core body exposed portion, on which no positive electrode active material mixture layer is formed, is provided in a portion of the positive electrode core body. Furthermore, the positive electrode collector is connected to the positive electrode core body exposed portion. Furthermore, the negative electrode plate includes a negative electrode core body made of metal and a negative electrode active material mixture layer formed on the surface of the negative electrode core body. A negative electrode core body exposed portion, on which no negative electrode active material mixture layer is formed, is provided in a portion of the negative electrode core body.

Furthermore, the negative electrode collector is connected to the negative electrode core body exposed portion.

For example, Japanese Published Unexamined Patent Application No. 2014-182993 (Patent Document 1) proposes a square secondary battery that uses an electrode body provided with a positive electrode core body exposed portion and a negative electrode core body exposed portion at one end portion.

BRIEF SUMMARY OF THE INVENTION

Development of on-vehicle secondary batteries, particularly, secondary batteries used in EVs and PHEVs that have a higher energy density are awaited. By connecting a collector that has been electrically connected in advance to a positive electrode plate or a negative electrode plate to a terminal attached to a sealing plate by welding by projecting an energy ray thereto, the space between the sealing plate and the electrode body can be made small easily; accordingly, it will be easier to fabricate a square secondary battery with high energy density. In such a case, an improvement in the connection reliability between the terminal and the collector is needed.

An object of the present disclosure is to provide a secondary battery with a higher reliability.

An aspect of the present disclosure which is a method of manufacturing a secondary battery that includes an electric body that includes a positive electrode plate and a negative electrode plate, an outer package that includes an opening and that houses the electrode body, a sealing plate that seals the opening, a terminal attached to the sealing plate with a resin member interposed therebetween, a tab portion provided in the positive electrode plate or the negative electrode plate, and a collector that electrically connects the tab portion and the terminal to each other, the method of manufacturing a secondary battery including welding the terminal and the collector together by projecting an energy ray, wherein in a state before the welding is performed, the collector includes a rough surface portion that has a surface roughness that is larger than that of a portion other than the rough surface portion, and in the welding, the terminal and the collector are connected to each other by welding by projecting an energy ray onto the rough surface portion.

In the method of manufacturing the secondary battery that is an aspect of the present disclosure, the rough surface portion is provided on the collector, and by projecting an energy ray onto the rough surface portion, the collector and the terminal are connected to each other by welding. Since the rough surface portion has a surface roughness that is larger than that of the other portions of the collector, the energy ray is not easily reflected compared with other portions. Accordingly, when an energy ray is projected to the rough surface portion, the temperature of the collector increases easily, and the collector melts easily. Accordingly, the collector and the terminal can be connected by welding more efficiently, and a welded portion with a higher reliability is formed. Furthermore, creation of sputters, burrs, and the like can be suppressed efficiently. Accordingly, a secondary battery having a higher reliability in which internal short-circuiting, caused by sputters and burrs that have fallen off, is readily prevented from happening is provided.

Desirably, the electrode body includes a first electrode body element and a second electrode body element, the first electrode body element includes a first tab group that includes a plurality of the tab portions, and the second electrode body element includes a second tab group that includes a plurality of the tab portions. Desirably, the method further includes connecting the first tab group and the second tab group to the collector, and unifying the first electrode body element and the second electrode body element into one, in which the welding is performed after the connecting, and the unifying is performed after the welding.

With such a configuration, the space between the sealing plate and the electrode body can be made smaller and the secondary battery becomes higher in energy density.

Desirably, the method further includes attaching, before the welding, the terminal to the sealing plate with the resin member interposed therebetween.

With such a method, the secondary battery can be manufactured more readily. Furthermore, in the method of manufacturing the secondary battery that is an aspect of the present disclosure, since the collector and the terminal can be connected by welding at an intended position in an efficient manner, a temperature increase in the overall terminal can be suppressed. Accordingly, a degradation in the resin member disposed between the terminal and the sealing plate can be suppressed effectively. Accordingly, a decrease and the like in the sealing property between the sealing plate and the terminal caused by the resin member can be suppressed effectively.

The secondary battery can be configured so that the terminal includes a first area formed of a first metal that is a same type of metal as that of the collector, and a second area formed of a second metal that is a different type of metal with respect to that of the collector, a thermal conductivity of the second metal is lower than a thermal conductivity of the first metal, at least a portion of the resin member is disposed between the second area and the sealing plate, and the collector is welded to the first area in the welding.

With the above, a degradation of the resin member caused when the terminal and the collector are welded together can be suppressed effectively. Accordingly, a decrease and the like in the sealing property between the sealing plate and the terminal caused by the resin member can be suppressed effectively.

The collector can include a thin wall portion that has a thickness that is smaller than that of a portion other than the thin wall portion, the rough surface portion can be formed on a surface of the thin wall portion, and in the welding, the thin wall portion can be welded to the terminal by projecting an energy ray onto the rough surface portion.

With the above, the reliability of the welded portion between the terminal and the collector can be improved. Furthermore, a creation of sputters when welding the terminal and the collector together can be suppressed efficiently.

In the welding, a protrusion provided on the terminal can be disposed inside an opening or a cut-out provided in the collector, and the protrusion and an edge portion of the opening or the cut-out can be welded together.

With the above, the reliability of the welded portion between the terminal and the collector can be improved. Furthermore, a creation of sputters when welding the terminal and the collector together can be suppressed efficiently.

In the collector, the rough surface portion can be provided in a circumference of the opening or the cut-out.

The method can further include forming that forms the rough surface portion on the collector after disposing the protrusion inside the opening or the cut-out, and welding after the forming.

With such a method, the rough surface portion can be reliably formed at a predetermined position; accordingly, a reliable welded portion can be formed.

The rough surface portion can be formed on the collector before the protrusion is disposed inside the opening or the cut-out.

With such a method, even when micro metal powder is created when providing the rough surface portion, the metal powder can be easily removed from the collector. Furthermore, since the secondary battery can be assembled after the metal powder has been removed from the collector, the metal powder becoming mixed in the battery case can be prevented effectively.

The rough surface portion can be formed by projecting an energy ray onto the collector.

With such a method, the rough surface portion can be reliably formed at a predetermined position and with a predetermined surface roughness.

The present disclosure can provide a secondary battery having a higher reliability.

BRIEF DESCRIPTION OF THE SEVERAL VIEWS OF THE DRAWINGS

FIGS. 9A and 9B are cross-sectional views of the negative electrode collector and the negative electrode terminal taken along a short direction of the sealing plate in which FIG. 9A is a diagram before the negative electrode collector and the negative electrode terminal are welded together, and FIG. 9B is a diagram after the negative electrode collector and the negative electrode terminal have been welded together;

FIGS. 11A and 11B are cross-sectional views of a negative electrode collector and a negative electrode terminal of a second exemplary embodiment taken along the short direction of the sealing plate, in which FIG. 11A is a diagram before the negative electrode collector and the negative electrode terminal are welded together and FIG. 11B is a diagram after the negative electrode collector and the negative electrode terminal have been welded together;

FIGS. 12A and 12B are cross-sectional views of a negative electrode collector and a negative electrode terminal of a third exemplary embodiment taken along the short direction of the sealing plate, in which FIG. 12A is a diagram before the negative electrode collector and the negative electrode terminal are welded together, and FIG. 12B is a diagram after the negative electrode collector and the negative electrode terminal have been welded together;

FIGS. 14A and 14B are enlarged views near the negative electrode collector of the secondary battery according to the fourth exemplary embodiment in which FIG. 14A is a diagram before the negative electrode collector and the negative electrode terminal are welded together, and FIG. 14B is a diagram after the negative electrode collector and the negative electrode terminal have been welded together.

DETAILED DESCRIPTION OF THE INVENTION

A configuration of a square secondary battery 20 according to a first exemplary embodiment will be described below. Note that the present disclosure is not limited to the first exemplary embodiment described below.

Figure 1:
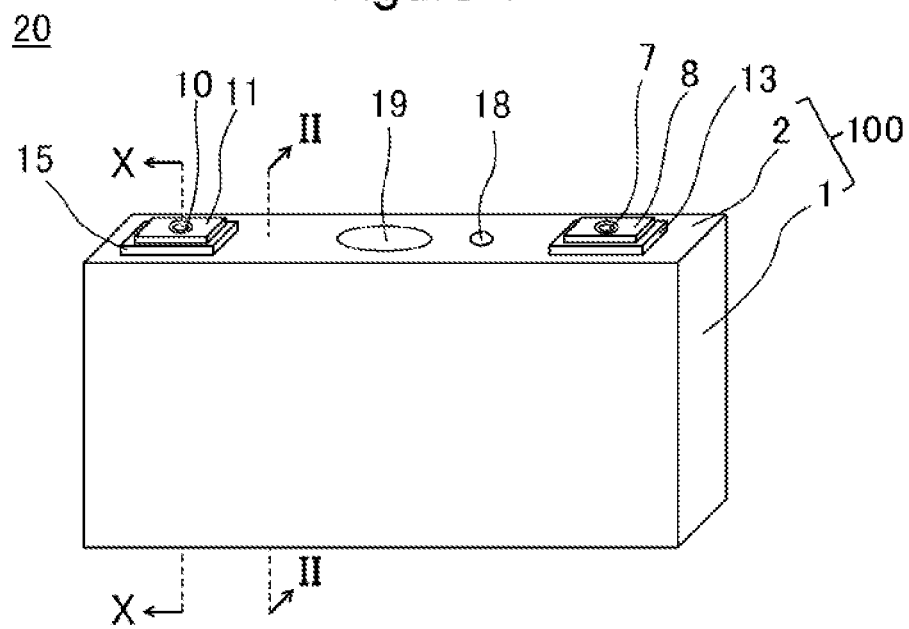
FIG. 1 is a perspective view of a square secondary battery according to a first exemplary embodiment.
Figure 2:
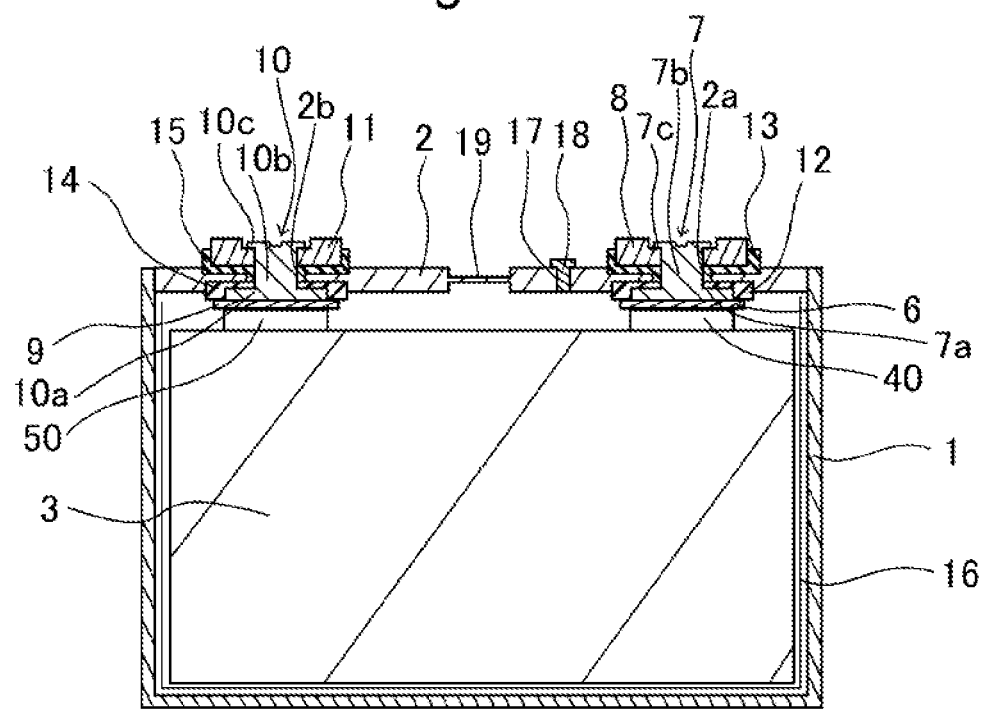
FIG. 2 is a cross-sectional view taken along line II-II in FIG. 1.

FIG. 1 is a perspective view of the square secondary battery 20. FIG. 2 is a cross-sectional view taken along line II-II in FIG. 1. As illustrated in FIGS. 1 and 2, the square secondary battery 20 includes a battery case 100 formed of a bottomed and polygonal-tube-shaped square outer package 1 including an opening, and a sealing plate 2 that seals the opening of the square outer package 1. The square outer package 1 and the sealing plate 2 are, desirably, formed of metal and are, desirably, formed of aluminum or an aluminum alloy, for example. An electrode body 3 including positive electrode plates and negative electrode plates are housed inside the square outer package 1 together with an electrolyte. A resin insulation sheet 16 is disposed between the electrode body 3 and the square outer package 1.

Positive electrode tab portions 40 and negative electrode tab portions 50 are provided at an end portion of the electrode body 3 on the sealing plate 2 side. The positive electrode tab portions 40 are electrically connected to a positive electrode terminal 7 through a positive electrode collector 6. The negative electrode tab portions 50 are electrically connected to a negative electrode terminal 10 through a negative electrode collector 9.

The positive electrode collector 6 is disposed along the sealing plate 2, the positive electrode tab portions 40 are connected to a surface of the positive electrode collector 6 on the electrode body 3 side, and the positive electrode tab portions 40 are bent. Accordingly, the secondary battery has a smaller space between the sealing plate 2 and the electrode body 3 and has a higher energy density. The negative electrode collector 9 is disposed along the sealing plate 2, the negative electrode tab portions 50 are connected to a surface of the negative electrode collector 9 on the electrode body 3 side, and the negative electrode tab portions 50 are bent. Accordingly, the secondary battery has a smaller space between the sealing plate 2 and the electrode body 3 and has a higher energy density.

A resin inner insulation member 12 is disposed between the sealing plate 2 and the positive electrode terminal 7. A metal positive electrode external conductive member 8 is disposed on a battery outer surface side of the sealing plate 2 with a resin outer insulation member 13 interposed in between. The positive electrode terminal 7 penetrates through a positive electrode terminal attachment hole 2a of the sealing plate 2 and a through hole of the positive electrode external conductive member 8 and is riveted to the positive electrode external conductive member 8. Note that the positive electrode terminal 7 and the positive electrode external conductive member 8 are desirably formed of metal, and, more desirably, are formed of aluminum or an aluminum alloy.

The positive electrode terminal 7 includes a flange portion 7a that has an outside diameter that is larger than an inside diameter of the positive electrode terminal attachment hole 2a of the sealing plate 2, an insertion portion 7b that penetrates the positive electrode terminal attachment hole 2a, and a rivet portion 7c that is positioned on the distal end side of the insertion portion 7b and that has an enlarged diameter. The positive electrode collector 6 is connected to the flange portion 7a. The shape of the flange portion 7a in plan view is not limited to any shape and can be a round shape, a polygonal shape, or the like.

A resin inner insulation member 14 is disposed between the sealing plate 2 and the negative electrode terminal 10. A metal negative electrode external conductive member 11 is disposed on a battery outer surface side of the sealing plate 2 with a resin outer insulation member 15 interposed in between. The negative electrode terminal 10 penetrates through a negative electrode terminal attachment hole 2b of the sealing plate 2 and a through hole of the negative electrode external conductive member 11 and is riveted to the negative electrode external conductive member 11. Note that the negative electrode terminal 10 and the negative electrode external conductive member 11 are desirably formed of metal. More desirably, the negative electrode terminal 10 includes a portion formed of copper or a copper alloy on an inner side of the battery case 100 and a portion formed of aluminum or aluminum alloy on an outer side of the battery case 100. Furthermore, the negative electrode external conductive member 11 is desirably formed of aluminum or an aluminum alloy. Note that a nickel layer can be provided on a surface of the portion formed of copper or a copper alloy. Furthermore, a nickel layer can be provided in a portion between the portion formed of copper or a copper alloy and the portion formed of aluminum or an aluminum alloy.

The negative electrode terminal 10 includes a flange portion 10a that has an outside diameter that is larger than an inside diameter of the negative electrode terminal attachment hole 2b of the sealing plate 2, an insertion portion 10b that penetrates the negative electrode terminal attachment hole 2b, and a rivet portion 10c that is positioned on the distal end side of the insertion portion 10b and that has an enlarged diameter. The negative electrode collector 9 is connected to the flange portion 10a. The shape of the flange portion 10a in plan view is not limited to any shape and can be a round shape, a polygonal shape, or the like.

An electrolyte injection hole 17 is provided in the sealing plate 2, and the electrolyte injection hole 17 is sealed with a sealing plug 18 after an electrolyte is injected inside the battery case 100 through the electrolyte injection hole 17.

A gas discharge valve 19 that breaks when the pressure inside the battery case 100 becomes equivalent to or higher than a predetermined value and that discharges gas inside the battery case 100 to the outside of the battery case 100 is provided in the sealing plate 2.

Fabrication of Positive Electrode Plate

A method for manufacturing the square secondary battery 20 will be described next.

A positive electrode slurry containing lithium-nickel-cobalt-manganese composite oxide as a positive electrode active material, polyvinylidene fluoride (PVdF) as a binding agent, a carbon material as a conductive agent, and N-methyl-2-pyrrolidone (NMP) as a dispersion medium is fabricated. The positive electrode slurry is coated on both surfaces of a rectangular aluminum foil that is 15 µm thick and that serves as the positive electrode core body. Subsequently, by drying the above, the N-methyl-2-pyrrolidone in the positive electrode slurry is removed and the positive electrode active material mixture layers are formed on the positive electrode core body. Subsequently, a compression process is performed to compress the positive electrode active material mixture layers to a predetermined thickness. The positive electrode plate obtained in the above manner is cut into a predetermined shape.

Figure 3:
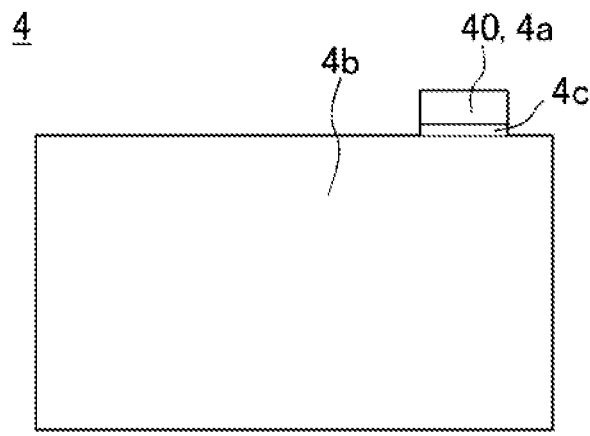
FIG. 3 is a plan view of a positive electrode plate according to the first exemplary embodiment.

FIG. 3 is a plan view of the positive electrode plate 4 fabricated in the above described method. As illustrated in FIG. 3, the positive electrode plate 4 includes a main body portion in which a positive electrode active material mixture layer 4b is formed on both surfaces of a rectangular positive electrode core body 4a. The positive electrode tab portion 40 is provided on the positive electrode plate 4. The positive electrode core body 4a protrudes from an edge of the main body portion. The protruded positive electrode core body 4a constitutes the positive electrode tab portion 40. Furthermore, a positive electrode protective layer 4c that has an electrical resistance that is larger than that of the positive electrode active material mixture layer 4b may be provided in a portion of the positive electrode tab portion 40 adjacent to the positive electrode active material mixture layer 4b. The positive electrode protective layer desirably contains ceramic particles formed of alumina, silica, or zirconia, and binder. Furthermore, the positive electrode protective layer more desirably contains conductive particles formed of a carbon material or the like.

Fabrication of Negative Electrode Plate

A negative electrode slurry containing graphite as a negative electrode active material, styrene-butadiene rubber (SBR) as a binding agent, carboxymethyl cellulose (CMC) as a thickener, and water is fabricated. The negative electrode slurry is coated on both surfaces of a rectangular copper foil that is 8 µm thick and that serves as the negative electrode core body. Subsequently, by drying the above, the water in the negative electrode slurry is removed and the negative electrode active material mixture layers are formed on the negative electrode core body. Subsequently, a compression process is performed to compress the negative electrode active material mixture layers to a predetermined thickness. The negative electrode plate obtained in the above manner is cut into a predetermined shape.

Figure 4:
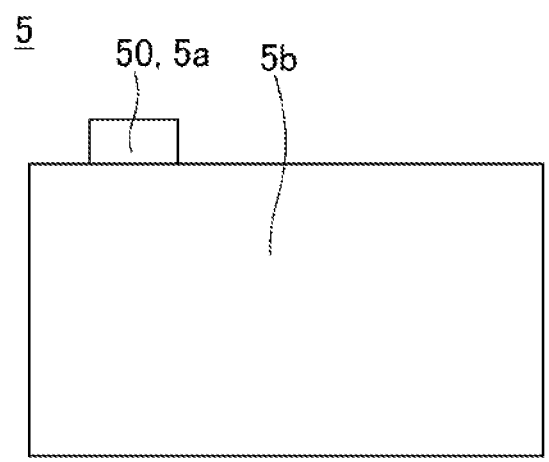
FIG. 4 is a plan view of a negative electrode plate according to the first exemplary embodiment.

FIG. 4 is a plan view of the negative electrode plate 5 fabricated in the above described method. As illustrated in FIG. 4, the negative electrode plate 5 includes a main body portion in which a negative electrode active material mixture layer 5b is formed on both surfaces of a rectangular negative electrode core body 5a. The negative electrode tab portion 50 is provided on the negative electrode plate 5. The negative electrode core body 5a protrudes from an edge of the main body portion. The protruded negative electrode core body 5a constitutes the negative electrode tab portion 50.

Fabrication of Electrode Body Elements

Figure 5:
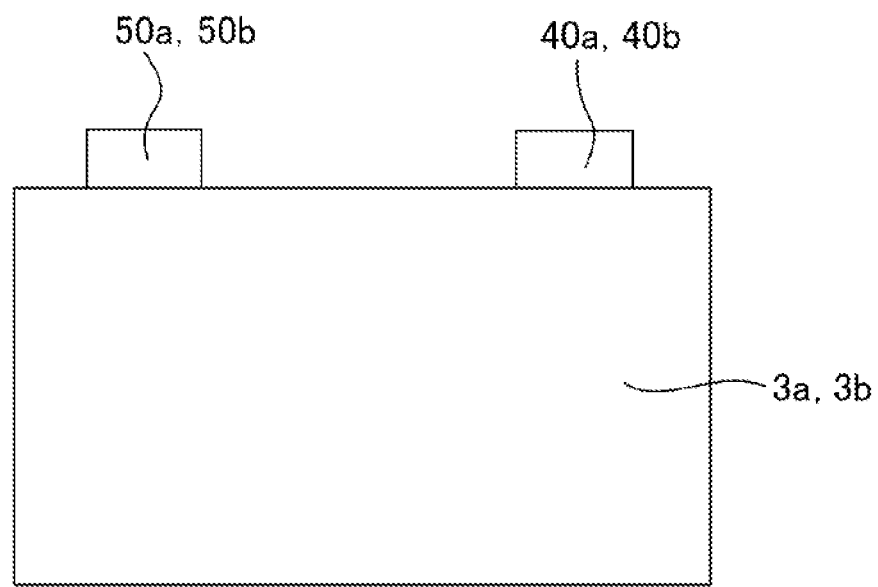
FIG. 5 is a plan view of an electrode body element according to the first exemplary embodiment.

Stacked electrode body elements (a first electrode body element 3a and a second electrode body element 3b) are fabricated by fabricating 50 pieces of positive electrode plates 4 and 51 pieces of negative electrode plates 5 with the above methods and by stacking each positive electrode plate 4 and each negative electrode plate 5 on each other with a rectangular polyolefin separators therebetween. As illustrated in FIG. 5, the electrode body elements (first electrode body element 3a and the second electrode body element 3b) each include on one end portion, positive electrode tab groups (a first positive electrode tab group 40a and a second positive electrode tab group 40b) in which a plurality of positive electrode tab portions 40 are stacked, and negative electrode tab group (a first negative electrode tab group 50a and a second negative electrode tab group 50b) in which a plurality of negative electrode tab portions 50 are stacked. Separators may be disposed on both outer surfaces of each electrode body element and the electrode plates and the separators may be fixed and stacked with tape and the like. Alternatively, an adhesion layer may be provided on each separator so that the separators and the positive electrode plates 4, and the separators and the negative electrode plates 5 are adhered to each other.

Note that the size of the separator in plan view is, desirably, the same or larger than the size of the negative electrode plate 5. A positive electrode plate 4 or a negative electrode plate 5 may be disposed between two separators and, after the vicinities of the rims of the separators are partially heat welded, the positive electrode plate 4 and the negative electrode plate 5 may be stacked on each other. Note that in fabricating the electrode body elements (3a and 3b), a long separator can be used, and the positive electrode plate 4 and the negative electrode plate 5 may be stacked on each other while the long separators are zigzag folded. Furthermore, a long separator can be used and the positive electrode plate 4 and the negative electrode plate 5 can be stacked on each other while winding the long separator. Furthermore, the electrode body elements are not limited to a stacked type. A long positive electrode plate and a long negative electrode plate having a long separator interposed therebetween may be wound to form a wound electrode body element.

Assembling Sealing Body

Figure 6:
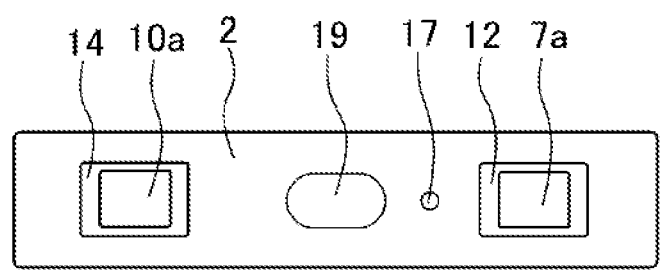
FIG. 6 is a bottom view of the sealing plate after the components have been attached.

Referring to FIGS. 2 and 6, a method of attaching the positive electrode terminal 7 and the positive electrode collector 6 to the sealing plate 2 will be described. The inner insulation member 12 is disposed on a battery inner surface side of the sealing plate 2, and the outer insulation member 13 and the positive electrode external conductive member 8 are disposed on the battery outer surface side of the sealing plate 2. The insertion portion 7b of the positive electrode terminal 7 inserted through a through hole of the inner insulation member 12, the positive electrode terminal attachment hole 2a of the sealing plate 2, a through hole of the outer insulation member 13, and the through hole of the positive electrode external conductive member 8. Subsequently, a distal end side of the insertion portion 7b of the positive electrode terminal 7 is reverted and the rivet portion 7c is formed. With the above, the positive electrode terminal 7, the inner insulation member 12, the outer insulation member 13, and the positive electrode external conductive member 8 are fixed to the sealing plate 2. Note that the negative electrode terminal 10, the inner insulation member 14, the outer insulation member 15, and the negative electrode external conductive member 11 are fixed to the sealing plate 2 with a similar method.

Connecting Collector and Tab Portions to Each Other

Figure 7:
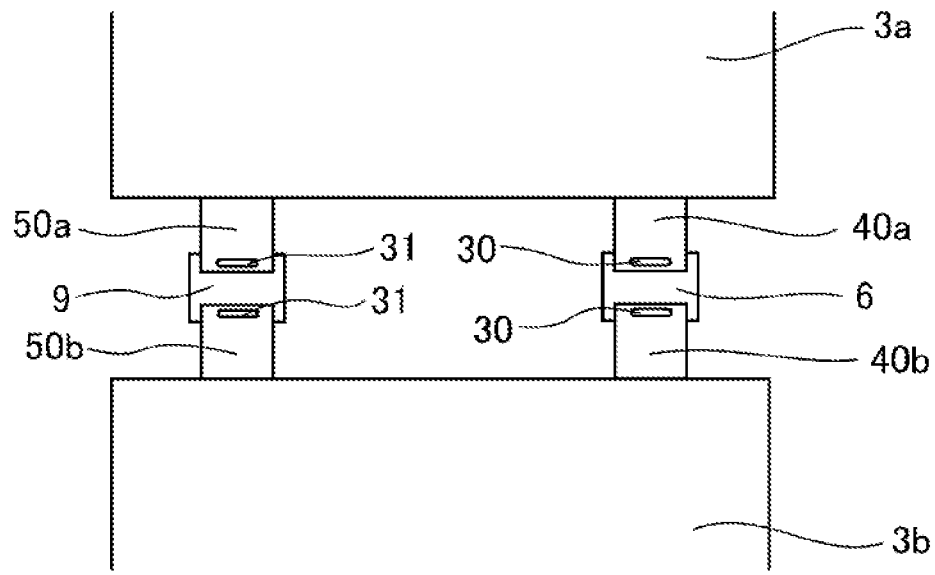
FIG. 7 illustrates a state in which positive electrode tab portions are connected to a positive electrode collector, and negative electrode tab portions are connected to a negative electrode collector.

FIG. 7 illustrates a state in which the positive electrode tab portions 40 are connected to the positive electrode collector 6, and the negative electrode tab portions 50 are connected to the negative electrode collector 9. Two electrode body elements are fabricated with the method described above. The electrode body elements are referred to as the first electrode body element 3a and the second electrode body element 3b. Note that the first electrode body element 3a and the second electrode body element 3b may have the same configuration or may have different configurations. The first electrode body element 3a includes the first positive electrode tab group 40a formed of the plurality of positive electrode tab portions 40, and the first negative electrode tab group 50a formed of the plurality of negative electrode tab portions 50. The second electrode body element 3b includes the second positive electrode tab group 40b formed of the plurality of positive electrode tab portions 40, and the second negative electrode tab group 50b formed of the plurality of negative electrode tab portions 50.

The positive electrode collector 6 and the negative electrode collector 9 are disposed between the first electrode body element 3a and the second electrode body element 3b. Subsequently, the first positive electrode tab group 40a provided in the first electrode body element 3a and the second positive electrode tab group 40b provided in the second electrode body element 3b are connected to the positive electrode collector 6 by welding. With the above, a welded portion 30 is formed. Furthermore, the first negative electrode tab group 50a provided in the first electrode body element 3a and the second negative electrode tab group 50b provided in the second electrode body element 3b are connected to the negative electrode collector 9 by welding. With the above, a welded portion 31 is formed. The welding method is desirably ultrasonic welding, resistance welding, or welding by projecting an energy ray, such as a laser. In particular, ultrasonic welding is desirable.

Connecting Terminal and Collector to Each Other

Figure 8:
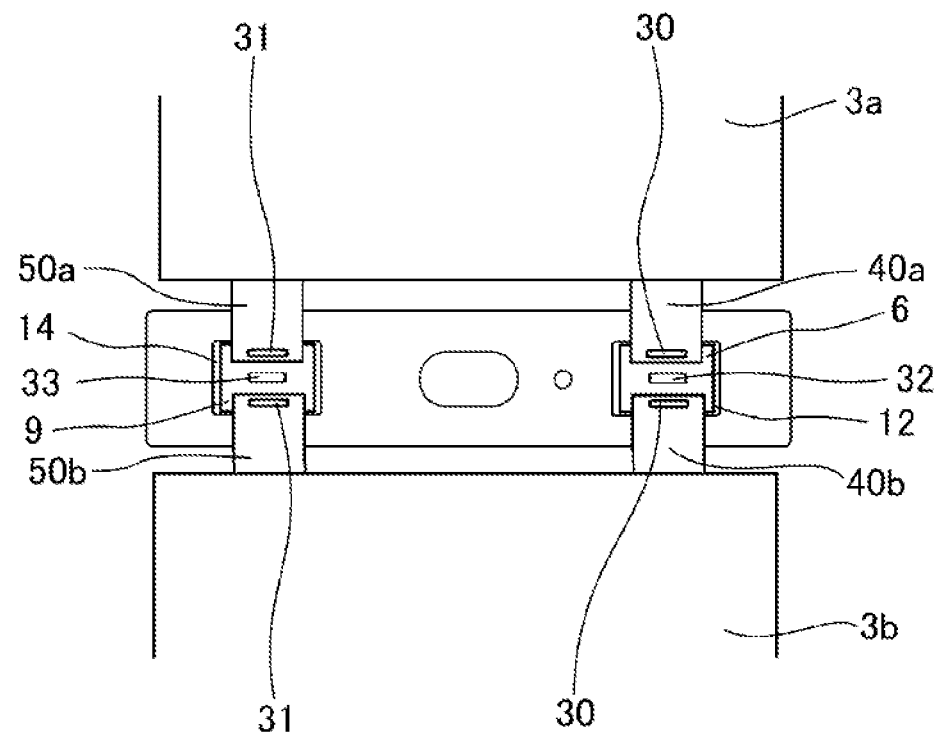
FIG. 8 is a diagram illustrating a state in which the positive electrode collector is connected to a positive electrode terminal, and the negative electrode collector is connected to a negative electrode terminal.

FIG. 8 illustrates a state in which the positive electrode collector 6 is connected to the flange portion 7a of the positive electrode terminal 7, and the negative electrode collector 9 is connected to the flange portion 10a of the negative electrode terminal 10. The positive electrode collector 6 is disposed on the flange portion 7a of the positive electrode terminal 7, and the electrode terminal 7 and the positive electrode collector 6 are connected by welding by projecting an energy ray, such as a laser. With the above, a welded portion 32 is formed. Furthermore, the negative electrode collector 9 is disposed on the flange portion 10a of the negative electrode terminal 10, and the negative electrode terminal 10 and the negative electrode collector 9 are connected by welding by projecting an energy ray, such as a laser. With the above, a welded portion 33 is formed. Note that in the above step, the first electrode body element 3a and the second electrode body element 3b are not unified as one, and are disposed separately.

Figure 9A:
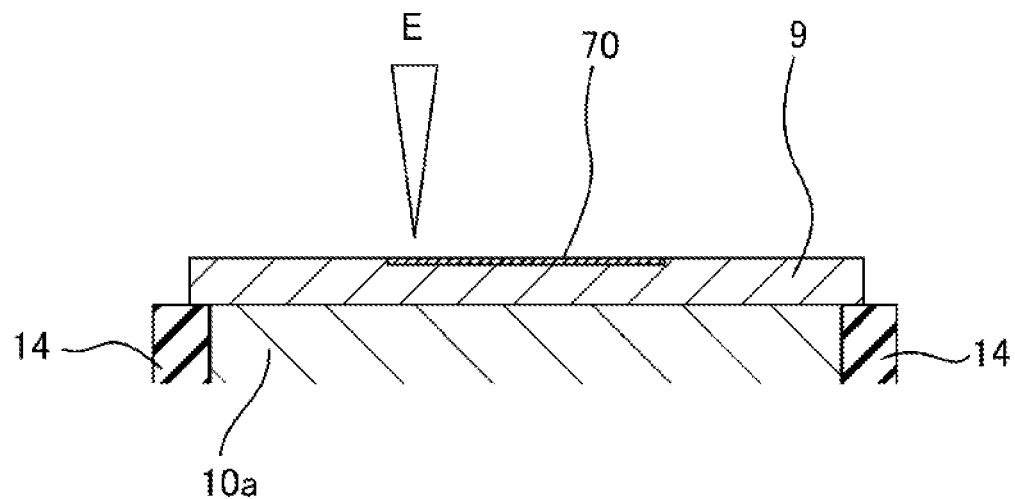
Figure 9B:
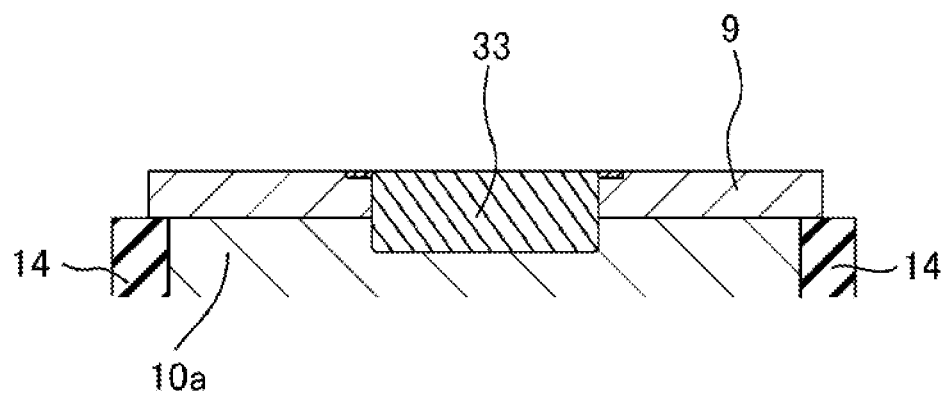

Details of Connecting Negative Electrode Terminal and Negative Electrode Collector to Each Other As illustrated in FIG. 9A, in the negative electrode collector 9, a rough surface portion 70 is formed on a surface that is on the opposite side of the surface opposing the flange portion 10a of the negative electrode terminal 10. The surface roughness of the rough surface portion 70 is larger than the other portions of the negative electrode collector 9 such as, for example, the portion of the negative electrode collector 9 opposing the flange portion 10a. Furthermore, an energy ray E is projected on the rough surface portion 70 provided on the negative electrode collector 9. With the above, as illustrated in FIG. 9B, the welded portion 33 is formed, and the negative electrode collector 9 and the negative electrode terminal 10 are connected to each other by welding.

Note that the surface roughness of the rough surface portion 70, for example, the arithmetic mean height Sa, is preferably 0.2 µm or larger and, more preferably, is 0.5 µm or larger.

Since the rough surface portion 70 is a portion that has a surface roughness that is larger than that of the other portions, the energy ray is not easily reflected. Accordingly, when an energy ray is projected on the rough surface portion 70, the temperature in the negative electrode collector 9 where the welding is to be performed increases easily, and the negative electrode collector 9 and the negative electrode terminal 10 melt easily. Accordingly, the negative electrode collector 9 and the negative electrode terminal 10 can be connected to each other by welding more efficiently, and a welding portion that has a higher reliability is formed. Furthermore, creation of sputters, burrs, and the like can be suppressed efficiently. Accordingly, a secondary battery having a higher reliability in which internal short-circuiting, caused by sputters and burrs that have fallen off, is readily prevented from happening is provided. Note that in a case in which the negative electrode collector 9, and the portion in the negative electrode terminal 10 in which the negative electrode collector 9 is connected by welding are formed of copper or an copper alloy, the melting point thereof is high and the energy ray is easily reflected thereat; accordingly, it is particularly effective to provide the rough surface portion and perform welding projecting an energy ray onto the rough surface portion.

By projecting an energy ray onto the rough surface portion 70 and connecting the negative electrode collector 9 and the negative electrode terminal 10 to each other by welding, an increase in the temperature of the overall negative electrode terminal 10 can be suppressed. Accordingly, the sealing property of the inner insulation member 14 and the outer insulation member 15, serving as resin members that are disposed between the negative electrode terminal 10 and the sealing plate 2 and that seal the battery case 100, can be effectively prevented from becoming degraded due to degradation of the sealing property of the inner insulation member 14 and the outer insulation member 15 by the heat. Note that it is only sufficient that at least either one of the inner insulation member 14 and the outer insulation member 15 serves to seal the battery case 100.

Figure 10:
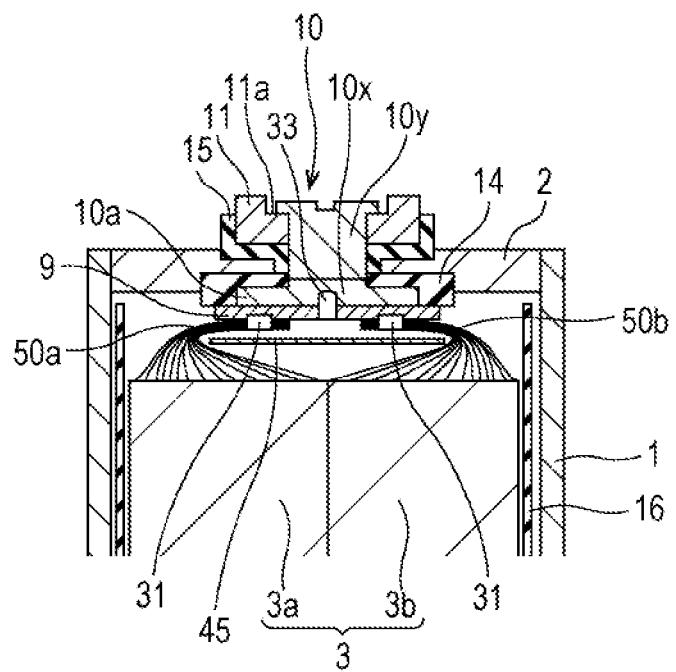
FIG. 10 is a cross-sectional view taken along line X-X in FIG. 1, and is a cross-sectional view near the negative electrode terminal.

Note that as illustrated in FIG. 10, the negative electrode terminal 10 includes a first area 10x formed of copper or a copper alloy, and a second area 10y formed of aluminum or an aluminum alloy. Furthermore, the outer insulation member 15 serving as the resin member that seals the battery case 100 is disposed between the second area and the sealing plate 2 that have thermal conductivity that is lower than that of the first area 10x. Accordingly, the heat generated when welding the negative electrode terminal 10 and the negative electrode collector 9 to each other is not easily conducted to the outer insulation member 15 serving as a seal. Accordingly, the degradation of the sealing property can be reliably prevented. Note that desirably, the position of the boundary between the first area 10x and the second area 10y on the outer surface of the negative electrode terminal 10 is disposed on the electrode body 3 side with respect to the end portion of the negative electrode terminal attachment hole 2b of the sealing plate 2 on the electrode body 3 side.

Note that an area formed of another metal such as nickel may be formed between the first area 10x and the second area 10y. A recess 11a is provided in the negative electrode external conductive member 11. The rivet portion 10c of the negative electrode terminal 10 is disposed inside the recess 11a.

As the method of forming the rough surface portion 70 on the negative electrode collector 9, a method that projects an energy ray on the negative electrode collector 9 is particularly desirable. With the above, the rough surface portion 70 can be reliably formed in a predetermined area. For example, the rough surface portion 70 can be provided with a laser marker. As the laser, a green laser emitting a wavelength of 532 nm can be used.

Note that as a method of providing the rough surface portion 70 other than with a projection of an energy ray, one may conceive of using an abrasive, sandpaper, blasting, or chemical etching.

Note that the timing at which the rough surface portion 70 is provided on the negative electrode collector 9 is not limited to a particular timing.

The shapes of the welded portion 32 and the welded portion 33 in plan view are not limited to any shapes in particular. Lines of welded portions can be provided. Alternatively, the welded portion may be annular or round. Alternatively, the welded portion may be formed in a shape of a cross. The sizes of the welded portion 32 and the welded portion 33 in plan view are preferably 5 mm² or larger.

Fabrication of Electrode Body

The first positive electrode tab group 40a, the second positive electrode tab group 40b, the first negative electrode tab group 50a, and the second negative electrode tab group 50b are bent so that an upper surface of the first electrode body element 3a and an upper surface of the second electrode body element 3b in FIG. 7 are connected to each other directly or with another member interposed in between. With the above, the first electrode body element 3a and the second electrode body element 3b are unified as a single electrode body 3.

Note that it is desirable that a resin insulating plate 45 is disposed on the surface of the sealing plate 2 on the electrode body 3 side before the first electrode body element 3a and the second electrode body element 3b are unified into a single electrode body 3 and after the positive electrode terminal 7 and the positive electrode collector 6 have been connected to each other and the negative electrode terminal 10 and the negative electrode collector 9 have been connected to each other. Furthermore, the insulating plate 45 is, desirably, disposed so as to oppose the welded portion 33 between the negative electrode terminal 10 and the negative electrode collector 9. The insulating plate 45 is, desirably, connected to at least either one of the sealing plate 2, the inner insulation member 12, the inner insulation member 14, the positive electrode collector 6, the negative electrode collector 9, the positive electrode terminal 7, and the negative electrode terminal 10. The method of connection is, desirably, adhesion, fitting, or the like.

Assembling Square Secondary Battery

The electrode body 3 attached to the sealing plate 2 is covered with the insulation sheet 16 and is inserted into the square outer package 1. Subsequently, the sealing plate 2 and the square outer package 1 are adhered to each other by laser welding or the like to seal the opening of the square outer package 1. Subsequently, a nonaqueous electrolyte solution containing an electrolyte solvent and electrolyte salt is injected into the battery case 100 through the electrolyte injection hole 17 provided in the sealing plate 2. Subsequently, the electrolyte injection hole 17 is sealed with the sealing plug 18.

Second Exemplary Embodiment

A square secondary battery according to a second exemplary embodiment has a similar configuration to that of the square secondary battery 20 according to the first exemplary embodiment other than that the shapes of the negative electrode collector and the flange portion of the negative electrode terminal are different. Portions of the square secondary battery that are not described in the second exemplary embodiment may have configurations similar to those of the square secondary battery 20 according to the first exemplary embodiment.

Figure 11A:
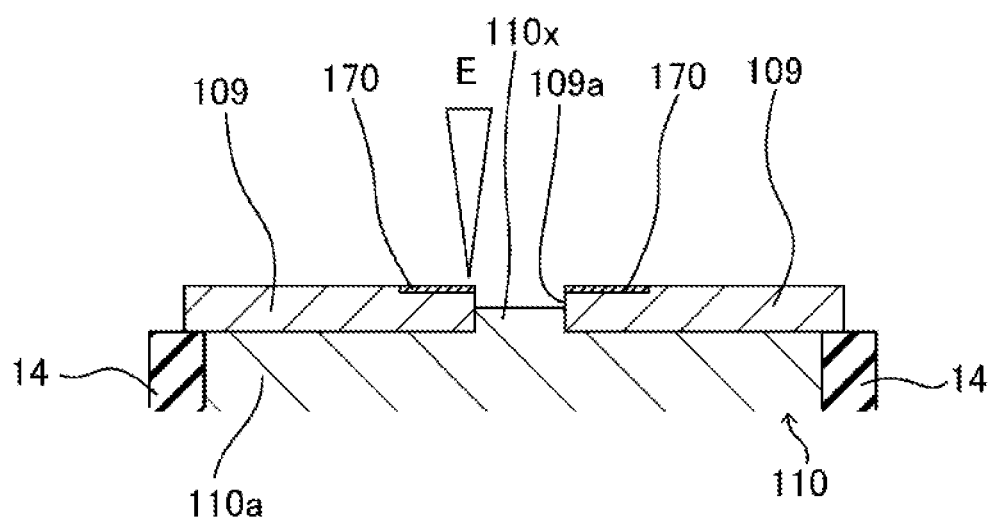
Figure 11B:
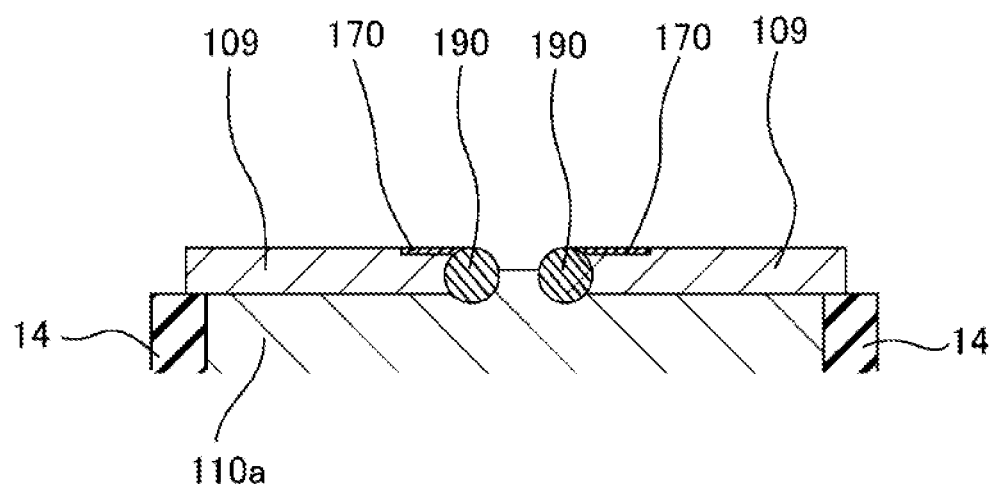

FIG. 11A is an enlarged cross-sectional view of a vicinity of a connection between a negative electrode collector 109 and a flange portion 110a of a negative electrode terminal 110, and illustrates a state before welding. FIG. 11B is an enlarged cross-sectional view of the vicinity of the connection between the negative electrode collector 109 and the flange portion 110a of the negative electrode terminal 110, and illustrates a state after the welding.

As illustrated in FIG. 11A, a protrusion 110x provided in the flange portion 110a of the negative electrode terminal 110 is disposed inside a collector opening 109a provided in the negative electrode collector 109. A rough surface portion 170 is formed in a circumference of the collector opening 109a of the negative electrode collector 109. Subsequently, by projecting an energy ray E onto the rough surface portion 170, a welded portion 190 is formed as illustrated in FIG. 11B. With the above, the negative electrode collector 109 and the negative electrode terminal 110 are connected to each other by welding.

Note that in the second exemplary embodiment, a height of the protrusion 110x provided in the flange portion 110a is smaller than a height (a depth) of the collector opening 109a provided in the negative electrode collector 109. Accordingly, a surface of a distal end of the protrusion 110x is positioned inside the collector opening 109a. By having such a configuration, even if there are variations in the height of the protrusion 110x and the height (the depth) of the collector opening 109a, the dimensional relationship between the height of the protrusion 110x and the height (the depth) of the collector opening 109a can be effectively prevented from becoming overturned. Accordingly, connection by welding can be carried out in a more stable manner. Furthermore, the reliability of the welded portion can be increased further. Note that the difference between the height of the protrusion 110x and the height (the depth) of the collector opening 109a is preferably 1 mm or less, more preferably is 0.5 mm or less, and most preferably is 0.2 mm or less. Furthermore, the difference is preferably 0.05 mm or more. However, the configuration is not limited to the above. Note that the height of the protrusion 110x provided in the flange portion 110a and the height (the depth) of the collector opening 109a provided in the negative electrode collector 109 can be the same.

When viewed in a direction perpendicular to the negative electrode collector 109, the shape of the welded portion 190 is, desirably, an annular shape or a shape in which a portion of the annular shape has been cut away. Note that a plurality of spot-shaped welded portions 190 may be provided.

The shape of the protrusion 110x in plan view is not limited to any particular shape, and can be a round shape, a substantially polygonal shape, a substantially rectangular or square shape (including those in which the edge portions are rounded), or the like. Note that the shape of the protrusion 110x is desirably a shape in which the long axis and the short axis can be determined, such as an elliptical shape, an oblong shape, a substantially rectangular shape (including a shape in which the edge portions are rounded).

Third Exemplary Embodiment

A square secondary battery according to a third exemplary embodiment is similar to the square secondary battery according to the second exemplary embodiment other than that the position where the welded portion 190 formed by projection of an energy ray is different.

Figure 12A:
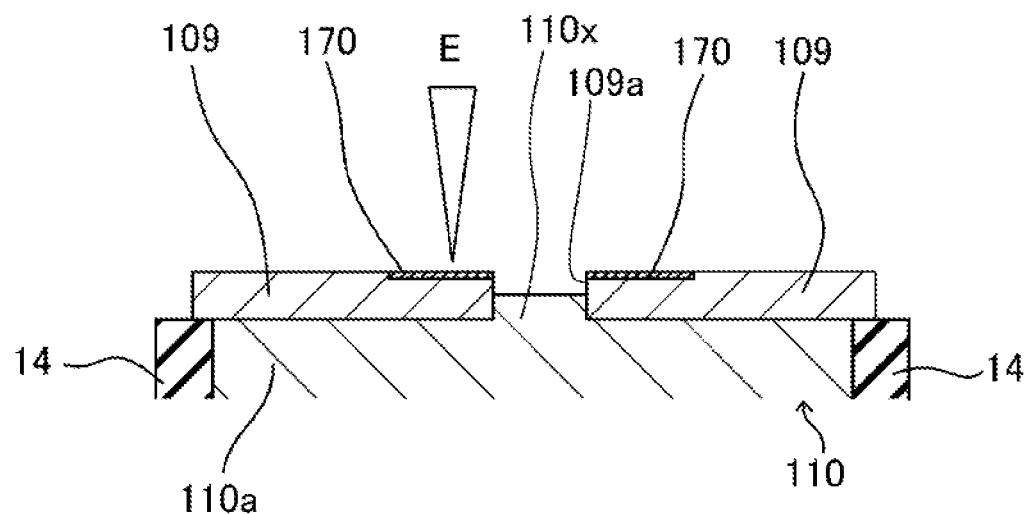
Figure 12B:
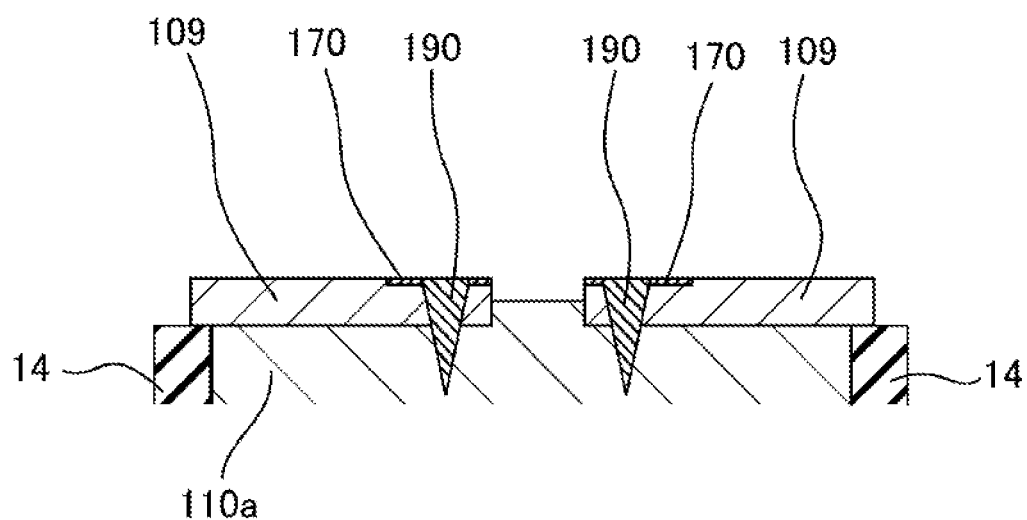

As illustrated in FIG. 12A, the energy ray E is projected at a position that is distanced away from an edge portion of the collector opening 109a. With the above, as illustrated in FIG. 12B, the welded portion 190 is formed at a position that is distanced away from the edge portion of the collector opening 109a.

By welding at a position that is distanced away from the edge portion of the collector opening 109a, the welded portion can be formed in a stable manner without being affected by a gap created between the edge portion of the collector opening 109a and the protrusion 110x. Accordingly, the reliability of the welded portion between the negative electrode terminal 110 and the negative electrode collector 109 is increased further. Note that when viewed in a direction perpendicular to the negative electrode collector 109, the shape of the welded portion 190 is, desirably, an annular shape or a shape in which a portion of the annular shape has been cut away. Note that a plurality of spot-shaped welded portions 190 may be provided.

Fourth Exemplary Embodiment

A square secondary battery according to a fourth exemplary embodiment is different from the square secondary battery 20 according to the first exemplary embodiment in that the shapes of the positive electrode collector, the inner insulation member on the positive electrode side, the negative electrode collector, and the inner insulation member on the negative electrode side are different. Furthermore, in the square secondary battery according to the fourth exemplary embodiment, the positions of the tab groups in the first electrode body element and in the second electrode body element are different from those in the square secondary battery 20 according to the first exemplary embodiment. Note that portions of the square secondary battery that are not described in the fourth exemplary embodiment may have configurations similar to those of the square secondary battery 20 according to the first exemplary embodiment.

Figure 13:
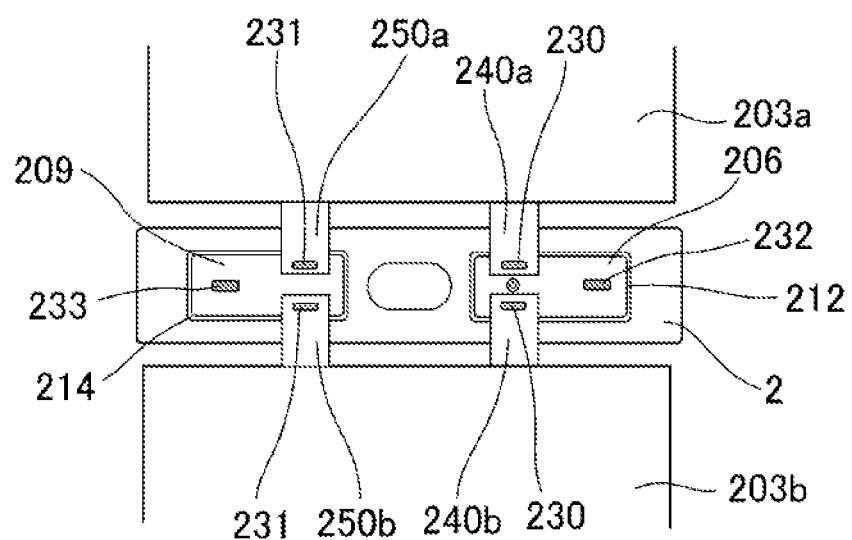
FIG. 13 is a diagram of a secondary battery according to a fourth exemplary embodiment illustrating a state in which a positive electrode collector is connected to a positive electrode terminal, and a negative electrode collector is connected to a negative electrode terminal.

As illustrated in FIG. 13, a first positive electrode tab group 240a of a first electrode body element 203a and a second positive electrode tab group 240b of a second electrode body element 203b are connected to a positive electrode collector 206 by welding; accordingly, a welded portion 230 is formed. A first negative electrode tab group 250a of the first electrode body element 203a and a second negative electrode tab group 250b of the second electrode body element 203b are connected to a negative electrode collector 209 by welding; accordingly, a welded portion 231 is formed. Furthermore, subsequently, similar to the first exemplary embodiment, the positive electrode collector 206 is disposed on the flange portion 7a of the positive electrode terminal 7 and a connection is established by welding by projecting an energy ray thereto. With the above, a welded portion 232 is formed. Furthermore, the negative electrode collector 209 is disposed on the flange portion 10a of the negative electrode terminal 10 and connection is established by wielding by projecting an energy ray thereto. With the above, a welded portion 233 is formed.

In the square secondary battery according to the fourth exemplary embodiment, the welded portion 230 and the welded portion 232 are formed at positions offset from each other in a longitudinal direction of the sealing plate 2. Furthermore, the welded portion 231 and the welded portion 233 are formed at positions offset from each other in the longitudinal direction of the sealing plate 2. Accordingly, when the positive electrode terminal 7 and the positive electrode collector 206 are welded, or when the negative electrode terminal 10 and the negative electrode collector 209 are welded, even when a sputter occurs, the sputter can be effectively prevented from adhering onto the positive electrode tab group or the negative electrode tab group. Accordingly, solidified sputters (metal particles) can be effectively prevented from getting mixed in the battery case 100.

Figure 14A:
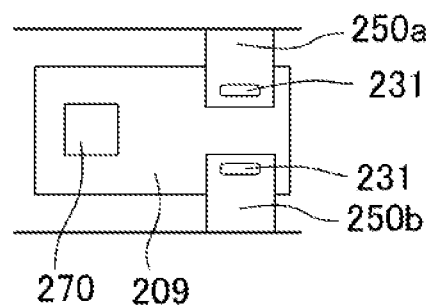
Figure 14B:
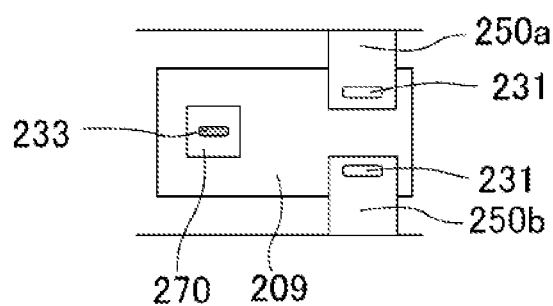

FIG. 14A is a diagram of the negative electrode collector 209 and the negative electrode terminal 10 before welding. In the negative electrode collector 209, a rough surface portion 270 is provided on a surface that is on the other side of the surface opposing the negative electrode terminal 10. Subsequently, by projecting an energy ray on the rough surface portion 270, the welded portion 233 illustrated in FIG. 14B is formed.

Secondary Battery Provided with Short-Circuiting Mechanism

The secondary battery of the present disclosure can be provided with a short-circuiting mechanism which is activated when the pressure inside the battery case becomes equivalent to or higher than a predetermined value due to overcharging and the like. Note that portions of the square secondary battery that are not described may have configurations similar to those of the square secondary battery of the first to fourth exemplary embodiment.

Figure 15A:
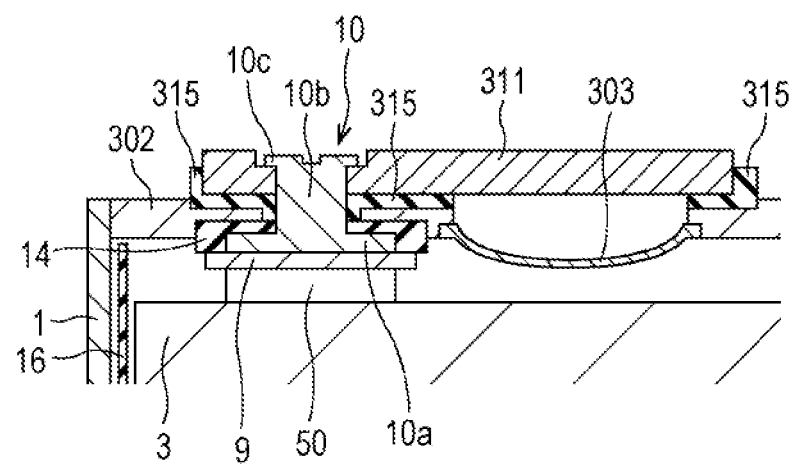
FIG. 15A is a cross-sectional view near a negative electrode terminal of a secondary battery according to a fifth exemplary embodiment taken along a longitudinal direction of a sealing plate.
Figure 15B:
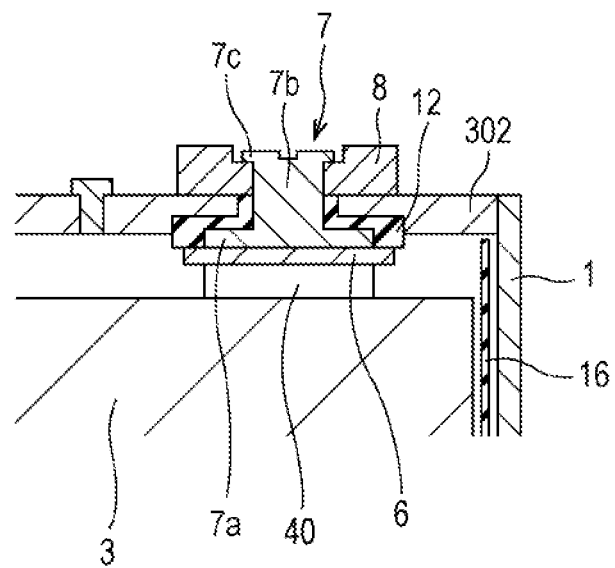
FIG. 15B is a cross-sectional view near a positive electrode terminal of the secondary battery according to the fifth exemplary embodiment taken along the longitudinal direction of the sealing plate.

FIG. 15A is a cross-sectional view taken along the longitudinal direction of a sealing plate 302 and illustrates a portion near the negative electrode terminal 10 of the secondary battery provided with a short-circuiting mechanism. FIG. 15B is a cross-sectional view taken along the longitudinal direction of the sealing plate 302 and illustrates a portion near the positive electrode terminal 7 of the secondary battery provided with a short-circuiting mechanism.

As illustrated in FIG. 15A, the sealing plate 302 is provided with a metal deformation portion 303. The deformation portion 303 is connected to the sealing plate 302 so as to close the through hole provided in the sealing plate 302. The deformation portion 303 desirably has a shape in which the middle portion protrudes towards the electrode body side. The negative electrode tab portions 50 provided in the electrode body 3 are connected to a surface of the negative electrode collector 9 on the electrode body 3 side. The negative electrode collector 9 is connected to a surface of the flange portion 10a of the negative electrode terminal 10 on the electrode body 3 side. The insertion portion 10b of the negative electrode terminal 10 penetrates through the through hole of the inner insulation member 14, the negative electrode terminal attachment hole of the sealing plate 302, the through hole of the outer insulation member 315, and a through hole of a negative electrode external conductive member 311, and a distal end side of the insertion portion 10b is riveted on the negative electrode external conductive member 311. The rivet portion 10c is formed on the distal end side of the insertion portion 10b. The negative electrode external conductive member 311 electrically connected to the negative electrode terminal 10 extends to a position opposing the deformation portion 303.

Furthermore, as illustrated in FIG. 15B, there is no insulation member disposed between the positive electrode external conductive member 8, which is electrically connected to the positive electrode terminal 7, and the sealing plate 302, and the positive electrode external conductive member 8 is electrically connected to the sealing plate 302. Note that a different metal member may be disposed between the positive electrode external conductive member 8 and the sealing plate 302.

When the pressure inside the battery case becomes equivalent to or higher than the predetermined value, the deformation portion 303 becomes deformed and becomes electrically connected to the negative electrode external conductive member 311. With the above, the positive electrode plate and the negative electrode plate become electrically connected to each other, and a short-circuited state is created outside the electrode body 3. With the above, the charging current can be prevented from further flowing into the electrode body 3.

Note that, desirably, a fuse portion is provided in the positive electrode collector 6, the positive electrode external conductive member 8, or the like and fusing of the fuse portion occurs with the flowing short circuit current when the short-circuiting mechanism is activated. With the above, overcharging can be, in a more reliable manner, prevented from progressing.

When the square secondary battery is overcharged and the pressure inside the battery case becomes equivalent to or higher than the predetermined value with gas that has been generated, the deformation portion 303 becomes deformed so as to be inverted and comes into contact with the negative electrode external conductive member 311. With the above, the positive electrode terminal 7 and the negative electrode terminal 10 become electrically connected to each other through the sealing plate 302, the deformation portion 303, and the negative electrode external conductive member 311. With the above, the charging current is suppressed from flowing into the electrode body 3, and overcharging is prevented from progressing. Furthermore, if a fuse portion is provided in the positive electrode collector 6, fusing will occur in the fuse portion with the short circuit current flowing due to the activation of the short-circuiting mechanism; accordingly, overcharging can be prevented from progressing in a more reliable manner.

Note that as illustrated in FIG. 15A, the negative electrode collector 9 and the deformation portion 303 can be configured to not overlap each other when viewed in a direction perpendicular to the sealing plate 302. With such a configuration, the flow passage of the gas can be reliably prevented from being closed by the negative electrode collector 9 and the deformation of the deformation portion 303 can be reliably prevented from being interrupted.

Note that when the negative electrode collector 9 is disposed between the deformation portion 303 and the electrode body 3, it is desirable that a through hole or a cut-out is provided in the negative electrode collector 9. When the inner insulation member 14 is disposed between the deformation portion 303 and the electrode body 3, it is desirable that a through hole or a cut-out is provided in the inner insulation member 14. Note that a short-circuiting mechanism can be provided in the secondary battery of the fourth exemplary embodiment. In such a case, an inner insulation member 214 and the negative electrode collector 209 are disposed between the deformation portion 303 and the electrode body 3.

Others

In the first exemplary embodiment described above, an example in which the electrode body 3 includes two electrode body elements is described; however, the number of the electrode body elements is not limited to the above number. The electrode body 3 may be a single stacked electrode body. Furthermore, the electrode body 3 may be a single wound electrode body in which a long positive electrode plate and a long negative electrode plate having a separator interposed therebetween are wound. Alternatively, the electrode body 3 may include three or more electrode body elements. Furthermore, the electrode body elements may be of a wound type or of a stacked type.

The energy ray used may include a laser beam, an electron beam, and an ion beam.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method of manufacturing a secondary battery that includes an electrode body that includes a positive electrode plate and a negative electrode plate, an outer package that includes an opening and that houses the electrode body, a sealing plate that seals the opening, a terminal attached to the sealing plate with a resin member interposed therebetween, a tab portion provided in the positive electrode plate or the negative electrode plate, and a collector that electrically connects the tab portion and the terminal to each other, the method of manufacturing the secondary battery comprising: welding the terminal and the collector together by projecting an energy ray, wherein in a state before the welding is performed, the collector includes a rough surface portion that has a surface roughness that is larger than that of a portion other than the rough surface portion, and in the welding, the terminal and the collector are connected to each other by welding by projecting an energy ray onto the rough surface portion, wherein the electrode body includes a first electrode body element and a second electrode body element, the first electrode body element includes a first tab group that includes a plurality of the tab portions, the second electrode body element includes a second tab group that includes a plurality of the tab portions, the method further comprising, connecting the first tab group and the second tab group to the collector, and unifying the first electrode body element and the second electrode body element into one, the welding is performed after the connecting, and the unifying is performed after the welding, wherein the first electrode body element and the second electrode body element are disposed separately from the welding to the unifying.

2. The method of manufacturing the secondary battery according to claim 1, further comprising:

attaching, before the welding, the terminal to the sealing plate with the resin member interposed therebetween.

3. The method of manufacturing the secondary battery according to claim 1, wherein the rough surface portion is formed by projecting an energy ray onto the collector.

4. A method of manufacturing a secondary battery that includes an electrode body that includes a positive electrode plate and a negative electrode plate, an outer package that includes an opening and that houses the electrode body, a sealing plate that seals the opening, a terminal attached to the sealing plate with a resin member interposed therebetween, a tab portion provided in the positive electrode plate or the negative electrode plate, and a collector that electrically connects the tab portion and the terminal to each other, the method of manufacturing the secondary battery comprising: welding the terminal and the collector together by projecting an energy ray, wherein in a state before the welding is performed, the collector includes a rough surface portion that has a surface roughness that is larger than that of a portion other than the rough surface portion, and in the welding, the terminal and the collector are connected to each other by welding by projecting an energy ray onto the rough surface portion, wherein the collector includes a thin wall portion that has a thickness that is smaller than that of a portion other than the thin wall portion, the rough surface portion is formed on a surface of the thin wall portion, and in the welding, the thin wall portion is welded to the terminal by projecting an energy ray onto the rough surface portion.

5. A method of manufacturing a secondary battery that includes an electrode body that includes a positive electrode plate and a negative electrode plate, an outer package that includes an opening and that houses the electrode body, a sealing plate that seals the opening, a terminal attached to the sealing plate with a resin member interposed therebetween, a tab portion provided in the positive electrode plate or the negative electrode plate, and a collector that electrically connects the tab portion and the terminal to each other, the method of manufacturing the secondary battery comprising: welding the terminal and the collector together by projecting an energy ray, wherein in a state before the welding is performed, the collector includes a rough surface portion that has a surface roughness that is larger than that of a portion other than the rough surface portion, and in the welding, the terminal and the collector are connected to each other by welding by projecting an energy ray onto the rough surface portion, wherein in the welding, a protrusion provided on the terminal is disposed inside an opening or a cut-out provided in the collector, and the protrusion and an edge portion of the opening or the cut-out are welded together.

6. The method of manufacturing the secondary battery according to claim 5, wherein in the collector, the rough surface portion is provided in a circumference of the opening or the cut-out.

7. The method of manufacturing the secondary battery according to claim 5, further comprising: forming that forms the rough surface portion on the collector after disposing the protrusion inside the opening or the cut-out; and welding after the forming has been performed.

8. The method of manufacturing the secondary battery according to claim 5, wherein the rough surface portion is formed on the collector before the protrusion is disposed inside the opening or the cut-out.

* * * * *